F. B. HOWELL.
DYNAMO ELECTRIC MACHINE.
APPLICATION FILED APR. 17, 1908.
905,817.
Patented Dec. 1, 1908.
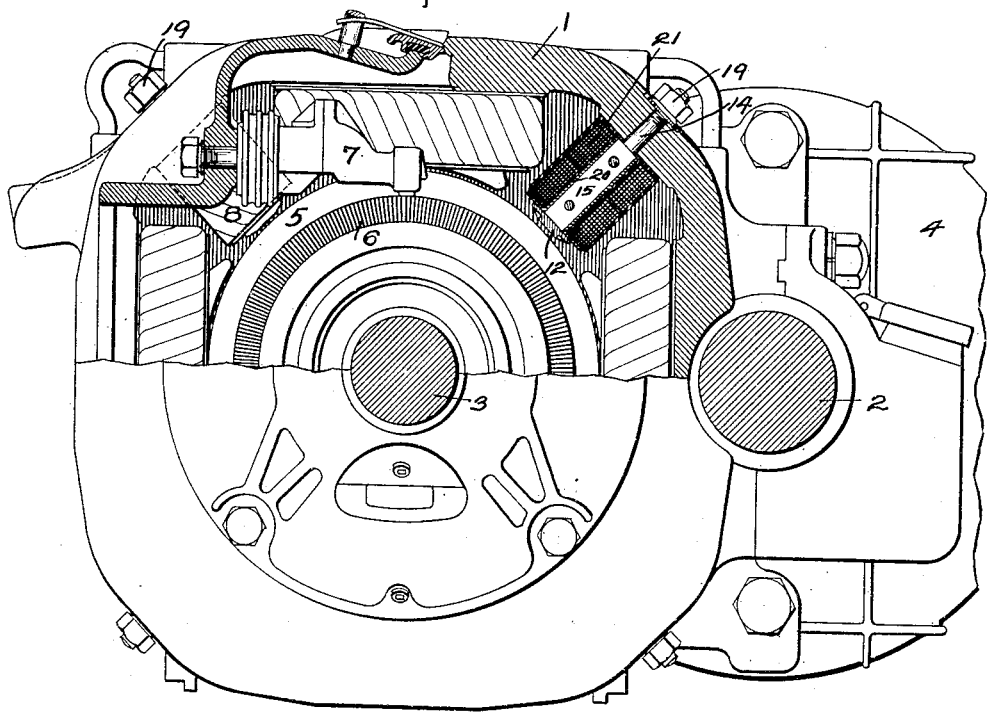
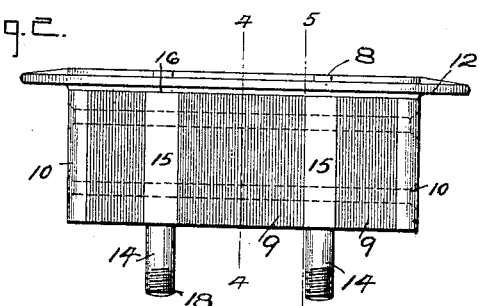
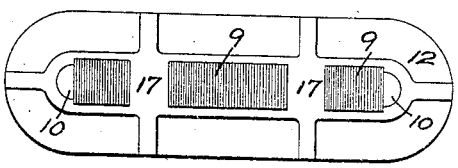
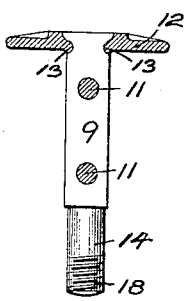
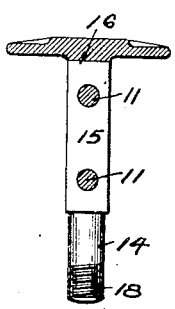
WITNESSES
W. R. Taylor.
J. Ellis Glenn
INVENTOR
FRED B. HOWELL
by Albert H. Davis
ATTY.

UNITED STATES PATENT OFFICE.

FRED B. HOWELL, OF SCHENECTADY, NEW YORK, ASSIGNOR TO GENERAL ELECTRIC COMPANY, A CORPORATION OF NEW YORK.

DYNAMO-ELECTRIC MACHINE.

No. 905,817.     Specification of Letters Patent.     Patented Dec. 1, 1908.

Application filed April 17, 1908. Serial No. 427,641.

*To all whom it may concern:*

Be it known that I, FRED B. HOWELL, a citizen of the United States, residing at Schenectady, county of Schenectady, State of New York, have invented certain new and useful Improvements in Dynamo-Electric Machines, of which the following is a specification.

My invention relates to dynamo-electric machines, and more particularly to the construction of pole-pieces for such machines and has for its object a simple construction, whereby the cost of building such pole-pieces is cheapened.

My invention is particularly applicable to the commutating pole-pieces. These pole-pieces are usually very narrow, and it is therefore very difficult to pass bars transversely through the laminæ composing them and screw bolts into these bars to fasten the pole-pieces to the yoke of the machine.

My invention consists in extending the fastening bolts by which the laminated poles are fastened to the frame of the machine, substantially all the way through the pole-pieces and making them of the same cross-section as the laminations themselves.

For a better understanding of my invention, however, reference may be had to the following description taken in connection with the accompanying drawing, in which Figure 1 is a view of a railway motor embodying my invention with parts broken away and in section to show the interior construction; Fig. 2 is an elevation of my pole-piece; Fig. 3 is a plan view of the pole-piece of Fig. 2; Fig. 4 is a section on the line 4 4 of Fig. 2; and Fig. 5 is a section on the line 5 5 of Fig. 2.

The railway motor shown is mounted on the car axle 2 and has a frame 1. The axle is geared to the motor shaft 3, the gears being contained in the gear case 4. The shaft 3 carries the armature 5 and commutator 6. Brush-holders 7 carry the current to the commutator and are bolted to, but insulated from, the frame 1. End frame members also bolted to the frame carry the bearings for the motor shaft. The main field poles are fastened to the frame 1. These parts may assume any usual or preferred form as my invention is not dependent upon these parts.

Each of the commutating pole-pieces 8, constructed in accordance with my invention, is built up of laminations 9 held between end-plates 10 by means of rivets 11. The rivets are headed in the end members 10, which are of greater thickness than the laminations, and are preferably rounded so that the coil when placed in position encounters no sharp edges. The energizing coil 21 is shown as being wound in two portions, insulated from each other, the pole-piece and the frame. The pole-piece has a flange 12 at its outer end made of electrically conducting but non-magnetic material permanently secured in place. This flange is preferably formed of a brass ring cast in place about the end of the pole-piece and entering grooves or recesses 13 formed in the pole-piece, whereby displacement of the flange is prevented. The bolts 14 for fastening the pole-pieces to the frame have a head portion 15 which is of the same cross-section as the laminations 9, but are preferably constructed so as to leave transverse recesses 16 in the pole face. These recesses 16 are occupied by ribs 17 which are cast integral with the flange 12. It will thus be seen that the heads of the bolts extend substantially all the way through the pole-piece and that the rivets 11 pass through them and make them an integral part of the pole-piece structure.

The stem 18 of each bolt is threaded and is of sufficient length to extend through the frame 1, where it is engaged by a nut 19. By tightening this nut the flange 12 engages the coil support 20 and clamps the coil securely in place against the motor frame.

I desire it to be understood that my invention is not limited to the particular pole-piece construction shown and described, and aim in the appended claims to cover all modifications which do not depart from the spirit of my invention.

What I claim as new and desire to secure by Letters Patent of the United States, is,—

1. A pole-piece for dynamo-electric machines, comprising laminations, fastening bolts therefor extending substantially all the way through the pole-piece, said bolts being of the same cross-section as the laminations, and means for fastening said laminations and bolts together.

2. A pole-piece for dynamo-electric machines, comprising laminations, fastening bolts therefor extending substantially all the way through the pole-piece, said bolts being of the same cross-section as the laminations, end members of greater thickness than the laminations, and means for fastening said end members, laminations and bolts together.

3. A pole-piece for dynamo-electric machines, comprising laminations, fastening bolts therefor extending substantially all the way through the pole-piece, said bolts being of the same cross-section as the laminations, end members of greater thickness than the laminations, and rivets passing through the laminations and bolts and headed in said end members.

In witness whereof, I have hereunto set my hand this 16th day of April, 1908.

FRED B. HOWELL.

Witnesses:
BENJAMIN B. HULL,
HELEN ORFORD.